June 14, 1932. E. H. FRIEDRICH Re. 18,492

METAL FLASHING

Original Filed Oct. 22, 1930

Inventor
Edmund H. Friedrich

By Emery Booth Varney & Holcombe
Attorneys

Reissued June 14, 1932

Re. 18,492

UNITED STATES PATENT OFFICE

EDMUND H. FRIEDRICH, OF HOLYOKE, MASSACHUSETTS, ASSIGNOR TO THE CHENEY COMPANY, OF WINCHESTER, MASSACHUSETTS, A CORPORATION OF MASSACHUSETTS

METAL FLASHING

Original No. 1,843,948, dated February 9, 1932, Serial No. 490,447, filed October 22, 1930. Application for reissue filed April 15, 1932. Serial No. 605,540.

This invention relates to an improvement in metal flashings.

An object of my invention is to provide a flashing for forming a water-tight joint between the top or upper surface of a wall and the coping stone. In the flashing construction disclosed in my pending application, Serial No. 405,180, filed November 6, 1929, there is shown, described and claimed a flashing having a longitudinally extending rib or struck-up portion, which is centrally located with reference to the opposite side edges of the flashing. This rib is substantially wedge-shape in cross section. This construction permits the opposite side edges to be folded downward onto the inner and outer faces of a wall and suitably connected to metal coverings on these faces by means of a lock, or other joint construction.

My present invention also discloses the longitudinally extending rib construction of the flashing, shown in my pending application and, in addition, struck-up short rib portions, on the opposite sides of this wedge-shaped rib portion which are located transversely of the flashing and of the struck-up longitudinally extending wedge-shaped portion. This construction, when in use, effectually prevents a coping block from moving or becoming displaced longitudinally of the flashing.

In my prior flashing construction, the wedge-shaped longitudinally extending rib effectually permits lateral movement of the coping. My present invention effectually prevents the coping from movement in either a longitudinal or lateral direction, as will be described.

Referring to the drawing.

Figure 1:
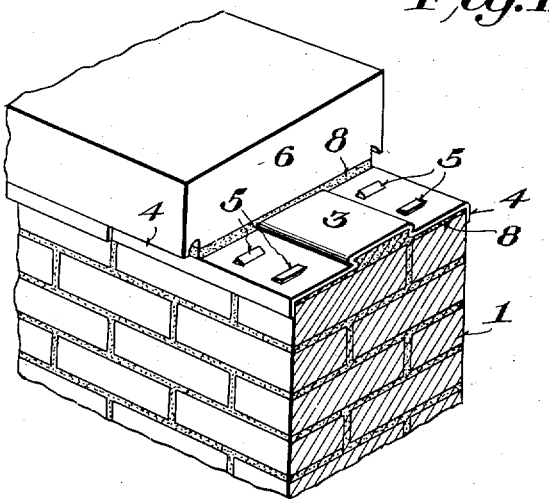
Fig. 1 is a perspective view showing the top or upper surface portion of a wall with the flashing in place and a block of coping located thereon.
Figure 2:
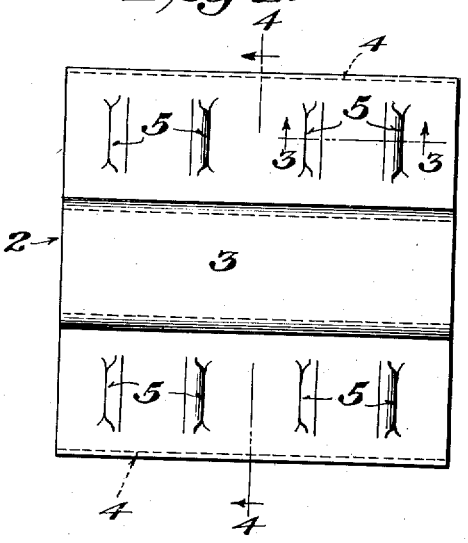
Fig. 2 is a plan view of the flashing removed, illustrating the struck-up and transversely arranged projections.
Figure 3:
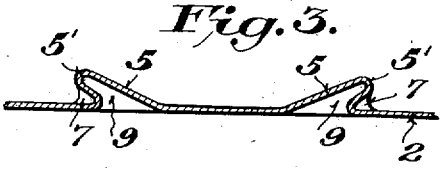
Fig. 3 is a sectional view on the line 3—3 of Fig. 2 showing two of the struck-up ribs.
Figure 4:
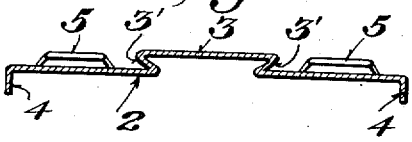
Fig. 4 is a sectional view on the line 4—4 of Fig. 2.

Referring to the drawings in detail:

1 designates a portion of a wall; 2 a length of the copper, or other metal of the flashing, having the wedge-shaped longitudinally extending rib 3 with oppositely located S-shaped sides 3′ and the downwardly extending sides 4, as shown in my pending application. 5 designates the transversely arranged struck-up ribs which are located, as shown, on the opposite sides of the wedge-shaped rib 3. These ribs are formed with the overhanging S-shaped portions 5′ which, it will be noted, extend in opposite directions (see Fig. 3), whereby the coping blocks 6 will be effectually prevented from longitudinal movements, since the mortar, cement, or other like adhesive material will fill the recesses 7 and 9 presenting an upwardly extending loop for the reception of mortar and the like. These struck-up portions advantageously may be substantially S-shape, as shown.

In use, the flashing is first placed on a layer of mortar 8 on the upper surface of the wall. When the flashing is placed on the wall, it is retained in place by the side flanges 4 and mortar under the opposite S-shaped sides of the wedge-shaped rib 3. Next a layer of mortar 8 is placed on the upper surface of the flashing. This will enter and fill the recesses 7, as well as the spaces 3′ under the rib 3. The block of coping 6 is now put in place on the mortar 8. It is obvious that the block of coping will be effectually prevented from both lateral and longitudinal movement, with reference to the upper surface of the wall; the rib 3 preventing lateral movement, and the struck-up S-shaped portions 5 preventing longitudinal movement, after the mortar 8 has set. It will, therefore, be seen that I have provided a metal flashing plate that is simple and economical in construction and one that effectually prevents a coping block from becoming displaced.

It should also be stated that the mortar 8, under the flashing plate, will enter the openings 9 and materially assist in preventing the longitudinal movement of the flashing plate 2.

What I claim is:

1. A sheet of flashing comprising a metal plate having a longitudinally extending struck-up wedge-shaped rib with overhanging side edges and struck-up transversely extending ribs formed with overhanging portions to provide recesses for receiving mortar or the like.

2. A sheet of flashing comprising a metal plate having a longitudinally extending struck-up wedge-shaped rib with S-shape side edges and struck-up transversely extending ribs formed with overhanging portions to provide recesses for receiving mortar or the like, said overhanging portions facing in opposite directions.

3. As an article of manufacture, a flashing plate comprising a member having a plurality of transversely arranged projections above its upper surface, each of said projections being in the form of an overhanging loop extending upwardly from the plate.

4. As an article of manufacture, a flashing plate comprising a member having a plurality of transversely arranged projections above its upper surface, said projections being substantially S-shaped in cross section and a longitudinally extending struck-up rib substantially wedge-shape in cross section, whereby when mortar is applied to the upper surface of the flashing and a coping block placed thereon the block will be prevented from both lateral and longitudinal movement, as described.

5. A sheet of flashing composed of metal, as copper, and formed with S-shape struck-up rib portions providing overlying recesses opening from said sheet on opposite sides thereof and at least one of said recesses terminating in a laterally extending section having substantially parallel sides in which a hardening material, as mortar or the like, engages for retaining coping block or the like in place.

6. A sheet metal flashing plate provided with a main ribbed portion formed in said plate and providing an undercut recess for the reception of mortar for locking said flashing sheet to said mortar bed against movement vertically and longitudinally in one direction, and a plurality of spaced projections formed from said sheet and arranged to receive mortar for locking said flashing sheet against movement in another longitudinal direction.

7. A sheet of flashing comprising a metal plate having a primary struck-up rib with overhanging side edges and extending throughout a substantial portion of the sheet in one direction, and a series of struck-up ribs extending in a transverse direction and formed with overhanging portions to provide recesses for receiving mortar or the like.

8. A sheet of flashing comprising a metal plate deformed to provide spaced ribs extending throughout the sheet in one direction and providing overhanging recesses for the reception of mortar to lock the sheet against vertical and lateral movement in one direction, and a series of additional locking members formed from said sheet and shaped to receive mortar for providing means for locking said sheet against a transverse lateral direction.

9. A sheet metal flashing for masonry structures comprising a sheet of sheet metal of the width to extend substantially through the wall of said structure and thereby provide a means for deflecting and draining moisture of infiltration from said wall, said flashing being deformed to provide a series of struck-up encased projections extending upwardly from the sheet providing recesses on opposite sides of said sheet for the reception of mortar to bond the flashing sheet and masonry structure against relative movement in all directions.

10. A sheet metal flashing for masonry structures comprising a sheet of sheet metal of the width to extend substantially through the wall of said structure and thereby provide a means for deflecting and drawing moisture of infiltration from said wall, said flashing being deformed to provide a series of spaced interlocking means arranged in right angular relation to each other and each providing recesses on opposite sides of said sheet for the reception of mortar to bond the flashing sheet and masonry structure against relative movement in all directions.

11. A building structure comprising a series of superposed courses of masonry interspaced by beds of mortar and the like, and a flashing imbedded in the mortar of one of said courses and comprising a metal sheet providing a means for intercepting moisture of infiltration into said masonry, said flashing sheet being deformed to provide spaced interlocking means arranged substantially at right angles to each other for receiving the mortar and bonding the flashing sheet and masonry against relatively shifting in all directions.

12. As an article of manufacture, a metal flashing sheet for masonry walls, said sheet being of substantial width to extend from side to side of said wall, and formed with a longitudinal series of transversely extending rib portions each including a sloping long side and a shorter side and presenting on their shorter sides, overhanging portions providing recesses for bonding material and the like.

13. As an article of manufacture, a metal flashing sheet for masonry walls, said sheet being formed with a longitudinal series of transversely extending ribs having reversely bent recesses forming seats for interlocking engagement with the mortar, the upper surface of one recess inclining downwardly toward the plane of said sheet.

14. As an article of manufacture, a metal flashing sheet for masonry walls, said sheet being of substantial width to extend from side to side of said wall and thereby provide means for deflecting and draining moisture of infiltration from said wall, said flashing sheet being deformed to provide means for permanently bonding the flashing sheet and wall together against movement in all directions including a plurality of groups of struck-up projections, the projections of each group being unsymmetrically disposed with relation to each other, and each providing recesses for the reception of mortar which, upon hardening, will serve to prevent relative lateral and longitudinal shifting of the sheet with reference to the masonry wall.

EDMUND H. FRIEDRICH.